United States Patent

Clubbe

[15] 3,636,383

[45] Jan. 18, 1972

[54] ACCURATELY SWITCHING BISTABLE CIRCUIT

[72] Inventor: Walter W. Clubbe, Coral Gables, Fla.

[73] Assignee: Robertshaw Controls Company, Richmond, Va.

[22] Filed: Dec. 31, 1969

[21] Appl. No.: 889,618

[52] U.S. Cl. ................................307/291, 307/247, 307/292

[51] Int. Cl. ..........................................................H03k 3/26

[58] Field of Search..................307/289, 290, 291, 247, 244, 307/292

[56] References Cited

UNITED STATES PATENTS 3,311,754 3/1967 Linder et al........................307/247 X

*Primary Examiner*—Donald D. Forrer
*Assistant Examiner*—John Zazworsky
*Attorney*—Anthony A. O'Brien

[57] ABSTRACT

A bistable circuit including an input steering gate having first and second branches for alternately applying input signals to respective sides of the bistable circuit, and an RC delayed transistor operative to disable one branch of the steering gate for a preselected time interval sufficient to permit complete switching of the circuit in response to slow rise time input pulses.

16 Claims, 1 Drawing Figure

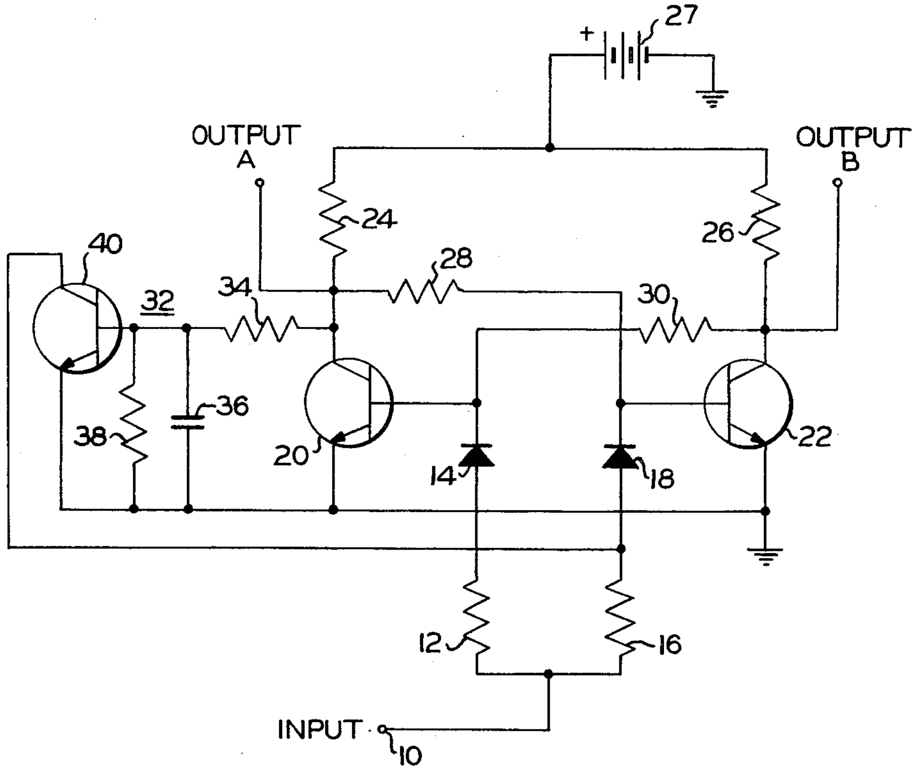
INVENTOR
WALTER W. CLUBBE
BY Anthony A. O'Brien
ATTORNEY

ACCURATELY SWITCHING BISTABLE CIRCUIT

BACKGROUND OF THE INVENTION

1. Field of the Invention

The present invention pertains to bistable circuits and more particularly to an accurately switching bistable circuit responsive to slow rise time input pulses.

2. Description of the Prior Art

Bistable or binary circuits which are capable of existing indefinitely in either one of two stable states and which can be caused to make a rapid transition from one state to the other have been extensively used in the past for a number of diversified applications in pulse circuitry. One of the more evident examples of the widespread us of bistable networks is in the field of data processing wherein binary circuits are often employed to perform switching, counting and storage functions in response to applied input command signals. In addition to its use in the computer industry, the binary circuit has enabled the design and development of a number of improved supervisory or control systems which have heretofore relied on relatively expensive mechanical or relay controlled switching for the regulation or the overall sequence of operation of the system and which have thus been prone to mechanical failures.

In most of these applications, input pulses are utilized to switch the bistable circuit between states, and input steering gates are extensively used where alternate switching is desired in response to successive pulses fed to a single input terminal. While conventional bistable circuits have generally exhibited satisfactory switching characteristics under normal conditions of operation, input pulses having relatively undistorted waveforms are often required to assure positive switching between states. Thus, in installations where input signals are transmitted over long communication paths and, as a result, have slow rise times, typical bistable circuits often fail to switch between states and in many cases will switch from one state to the other on the initial portion of the slow rise time input pulses and then will switch back to the initial state as the pulse continues to rise. In these situations, wave-shaping networks, which are often complex and expensive, are required to reconstitute the input pulses prior to their application to the bistable circuit. For these reasons, among others, a simple bistable network capable of positively responding to input pulse of degraded quality has been long needed but has heretofore been unavailable.

SUMMARY OF THE INVENTION

The present invention is summarized in that a bistable circuit includes a two-state network for producing a first output signal at a first output terminal when placed in a first state in response to the application of an input pulse signal on a first input terminal and for producing a second output signal at a second output terminal when placed in a second state in response to the application of an input pulse signal on a second input terminal, an input steering circuit including a first branch connected to the first input terminal of the two-state network and a second branch connected to the second input terminal of the two-state network for alternately applying input signals to the first and second input terminals of the two-state network, and a delay circuit connected with the two-state network and the input steering circuit for disabling the second branch of the input steering circuit when the two-state network is in the second state and for maintaining the second branch disabled for a preselected time interval immediately following a transition of the two-state network from the second state to the first state whereby the two-state network is completely switched between its stable states in response to input pulses having rise times less than the preselected time interval.

It is an object of the present invention to construct a bistable circuit responsive to slow rise time input pulses.

Another object of the present invention is to increase the sensitivity of a bistable circuit to the application of low-rise time input pulse signals.

The present invention has a further object in the construction of a bistable circuit including an input steering network controlled by an RC delayed transistor.

The present invention is advantageous over conventional bistable circuits in the provision of positive switching in response to low-rise time input pulses and delayed action input pulse steering for assuring only one change-of-state upon the receipt of each input pulse.

Further objects and advantages of the present invention will become apparent from the following description of the preferred embodiment when taken in conjunction with the accompanying drawing.

BRIEF DESCRIPTION OF THE DRAWING

The FIGURE is a schematic diagram of an accurately switching bistable circuit according to the present invention.

DESCRIPTION OF THE PREFERRED EMBODIMENT

As illustrated in the drawing, the present invention is embodied in a bistable circuit connected to receive input switching signals from a pulse source, represented by input terminal 10, for alternately producing output signals on either one of two output terminals A and B. The input pulses from input source 10 are connected to an input steering gate having first and second resistive branches. The first branch includes a resistor 12 connected between input source 10 and the anode electrode of a steering diode 14; similarly, the second branch includes resistor 16 connected between input source 10 and the anode of a steering diode 18. It is noted that the particular values of resistors 12 and 16 are not critical and may be equal or unequal depending upon particular operational features desired; for example, effective operation has been exhibited in one experiment in which the value of resistor 12 was greater than that of resistor 16 so that unequal impedance paths where presented to input signals from source 10.

The cathode electrodes of diodes 14 and 18 are connected to feed the respective base or input electrodes of a pair of transistors 20 and 22 for alternately rendering one of the transistors conductive as input pulses are received. The emitter electrodes of the two transistors 20 and 22 are connected to ground while the collector electrodes thereof are coupled by a respective one of a pair of resistors 24 and 26 to a source of operating potential 27. As illustrated, the collector electrodes of transistors 20 and 22 are coupled to feed output signals to their respective output terminals A and B in accordance with the conductive state of the circuit, as will be more fully explained below. In addition, the collector electrode of transistor 20 is cross-coupled back to the base electrode of transistor 22 by a resistor 28, and the collector and base electrodes of transistors 22 and 20, respectively, are similarly cross-coupled by a resistor 30.

A delay network, indicated generally at 32, is coupled between the output of transistor 20 and the junction of resistor 16 and diode 18 of the second resistive input steering branch. The delay network includes a resistor 34 coupled from the collector of transistor 20 to one end of a capacitor 36, one end of a resistor 38 and the base electrode of a transistor 40. The other ends of capacitor 36 and resistor 38 are connected to ground as is the emitter electrode of transistor 40 which has its collector electrode connected back to the second input steering branch at the junction of resistor 16 and diode 18.

In operation, when operating potential from source 27 is initially applied to the circuit, it will assume either one of two stable states, hereinafter referred to as states A and B. In order to clarify the description of operation which follows, the circuit will be considered as being in state A when a high-voltage level appears at output terminal A, and as being in state B when a high-voltage level appears at output terminal B. Furthermore, the transistors will be described as being "on" when in a conductive state and "off" when nonconductive. It should be understood of course, that a low-voltage level, rather than a high level, can be used to define the state of the bistable circuit depending upon the contemplated application of the circuit, the high level being described herein solely for the sake of clarity.

Consider the circuit upon initial energization to have assumed state A; i.e., output terminal A is at a high-voltage level with respect to output terminal B. In this state, transistor 20 is off so that its collector-emitter path exhibits a high impedance and is effectively an open circuit. As a result, no current flows through resistor 24 and the potential level of terminal A is very nearly equal to the voltage level provided by power supply 27. The high-potential level of the collector of transistor 20 is cross-coupled to the base electrode of NPN-transistor 22 which is therefore rendering conductive causing its collector-emitter impedance to be low. Thus, a current flow path is established from source 27 through a voltage divider formed by resistor 26 and the collector-emitter path of the transistor. Since the collector-emitter impedance of transistor 22 when on is much lower than the impedance of resistor 26, most the of voltage drop through the voltage divider appears across resistor 26 and the collector of the transistor is thus held at a low-voltage level. The low level of the collector of transistor 22 appears at output B and is also cross-coupled by resistor 30 to the base of transistor 20 maintaining it off. Thus, in state A, transistor 20 is off producing a high-potential level at output A, and transistor 22 is on producing a low-potential level at output B.

Since the collector electrode of transistor 20 is high in state A, capacitor 36 of delay network 32 is charged to a positive voltage level by current flowing from source 27 through resistors 23 and 34. As the capacitor builds up a charge, the base-emitter path of transistor 40 is turned on to render transistor 40 conductive. It is important to note at this point that due to the complex nature of low-level operation of solid-state devices, expressed analytically by the Ebers-Moll transistor equations, as the potential across the base-emitter junction of transistor 40 increases from zero to a point above the minimum switching level, the base-emitter impedance gradually decreases from infinity to approximately 30 ohms. As can be derived by small-signal analysis, the impedance variation is gradual and does not abruptly change from a high level to a low level as is normally considered to be true when large signals are used. Thus, as the charge across capacitor 36 tries to buildup across the base-emitter path of transistor 40, the impedance exhibited by the base-emitter junction of transistor 40 gradually decreases until a balanced or steady-state condition is reached. In this condition, the impedance of the base of the transistor is above its fully-on impedance of 30 ohms and permits capacitor 36 to maintain a steady-state charge which is slightly above the voltage level needed to maintain the transistor on. It can therefore be seen that in state A, when transistor 20 is off and output A is at a high potential, transistor 40 will be on and capacitor 36 will be charged to a level just above that required to maintain transistor 40 conductive.

When transistor 40 of delay network 32 is on, the junction point of resistor 16 and diode 18 is clamped to ground through the collector-emitter path of the transistor so that a pulse signal from input source 10 will be prevented from appearing at the base of transistor 22. In this manner, the second branch of the input steering gate is effectively disabled and precludes the application of a trigger pulse to transistor 22. Since the base of transistor 20 in state A is at a low potential, diode 14 of the steering network will be forward biased by a positive input pulse from input source 10. Thus, an input pulse for switching the bistable network from state A to state B will be coupled from input source 10 through resistor 12 and diode 14 to the base of transistor 20. As noted above, the input pulse initially will not appear at the base of transistor 22 since the junction of resistor 16 and diode 18 is clamped to ground by transistor 40, and further, since diode 18 is reversed biased by the high-potential level cross-coupled from the collector of transistor 20 by resistor 28.

The positive pulse coupled to the base of transistor 20 renders it conductive causing its collector impedance, and thus its voltage level, to rapidly drop to near zero. This produces a drop in the potential seen by the base of transistor 22 which then turns off and allows its collector potential to rise. Thus, upon receipt of the initial portion of the input pulse, the circuit changes from state A to state B with transistor 20 conductive or on and transistor 22 off. Consequently, the base electrode of transistor 20 is at a high potential due to the cross-coupling between the base of transistor 20 and the collector of transistor 22 to therefore reverse bias diode 14. Similarly, the cross-coupled base of transistor 22 is at a low-voltage level allowing diode 18 to become forward biased.

If the input pulse described above has a slow rise time, its continued rise would thereafter appear at the base of transistor 22 and would cause the bistable network to revert back to state A. However, since transistor 40 clamps the second branch of the steering gate to ground for a time delay subsequent to the initial transition of the circuit from state A to state B determined by the discharged time of capacitor 36 through resistor 34 and the collector-emitter path of transistor 20, the slow rise time pulse is prevented from causing transistor 22 to turn on. In this manner, a single input pulse having a slow rise time produces only a single transition of the bistable circuit from state A to state B.

In summary, when the circuit is in stable state A, capacitor 36 is charged, transistor 40 is conductive and the second branch of the input steering gate is disabled. Upon receipt of an input pulse, the circuit switches from state A to state B and transistor 40 is maintained on until capacitor 36 discharges thereby preventing the terminal portion of the input pulse from causing the circuit to switch back to state A.

With the circuit in state B; that is, with transistor 22 off and transistor 20 on, and subsequent to the discharge of capacitor 36 through transistor 20, transistor 40 is nonconductive and the junction of resistor 16 and diode 18 is no longer clamped to ground. Since the collector potential of transistor 22 is high and that of transistor 20 is low, the potential of the base electrode of transistor 22 is low and that of transistor 20 is high as a result of the cross-coupling provided by resistor 28 and 30. Consequently, diode 14 is reverse biased and diode 18 is forward biased so that a succeeding pulse will be coupled through resistor 16 and diode 18 to the base of transistor 22 causing it to turn on. As transistor 22 turns on, its collector potential drops and turns off transistor 20 which, in turn, causes the collector potential of transistor 20 to increase. As transistor 20 turns off and its collector potential rises, the base voltage of transistor 40 is prevented from increasing to its switching point by a predetermined time delay caused by the charging time of previously discharged capacitor 36. In this manner, the second branch of the input steering gate is maintained in an enabled condition to permit the input pulse to be fed to the base of transistor 22 until the circuit has completed the transition from state B to state A. Once the change-of-state has been completed and the circuit is once again in state A, the high-collector potential of transistor 20 charges capacitor 36 to turn on transistor 40 and clamp resistor 16 to ground. A subsequent input pulse will thereafter be fed through resistor 12, as before, to switch the circuit to state B.

Thus, the circuit of the present invention is capable of being accurately switched between its two stable states in response to input pulses having slow rise times and is efficiently prevented from undesirably exhibiting two transitions between states upon the receipt of a single input pulse.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A bistable circuit comprising power input means adapted to be connected with a source of operating potential, bistable means having first and second input terminals and first and second output terminals, said bistable means being connected with said power input means for producing a first output signal at said first output terminal when placed in a first state in response to the application of an input pulse signal on said first input terminal and for producing a second output signal at said second output terminal when placed in a second state in response to the application of an input pulse signal on said second input terminal, input steering means including a first branch connected to said first input terminal of said bistable means and a second branch connected to said second input terminal of said bistable means for alternately applying input signals to said first and second input terminals of said bistable means, and delay means connected with said bistable means and said input steering means for disabling said second branch of said input steering means when said bistable means is in said second state and for maintaining said second branch disabled for a preselected time interval immediately following a transition of said bistable means from said second state to said first state, said delay means including a storage capacitor connected with said second output terminal of said bistable means and switch means connected with said storage capacitor and said second branch of said input steering means for disabling said second branch of said input steering means in response to the stored charge across said storage capacitor whereby said bistable means is completely switched between its stable states in response to input pulses having rise times less than said preselected time interval.

2. The invention as recited in claim 1 wherein said first branch of said input steering means includes a first resistor serially connected at a junction point to a first diode, and said second branch of said input steering means includes a second resistor serially connected at a junction point to a second diode.

3. The invention as recited in claim 2 wherein said switch means is connected between said storage capacitor and said junction point of said second resistor and said second diode.

4. The invention as recited in claim 3 wherein said switch means comprises a transistor having its base-emitter junction connected across said storage capacitor.

5. The invention as recited in claim 1 wherein said bistable means includes a first resistive network having a midpoint connected to a first point of reference potential, a first transistor having first, second and third electrodes, and a second transistor having a first electrode connected with said first electrode of said first transistor by said first resistive network, a second electrode connected with said second electrode at a second point of reference potential and a third electrode.

6. The invention as recited in claim 5 wherein said first electrode of said first transistor is connected with said third electrode of said second transistor by a first resistor, and said first electrode of said second transistor is connected with said third electrode of said first transistor by a second resistor.

7. The invention as recited in claim 6 wherein said first electrodes of said first and second transistors are respectively connected to said first and second output terminals, and said third electrodes of said first and second transistors are respectively connected to said second and first input terminals.

8. The invention as recited in claim 7 wherein said first, second and third electrodes of said first and second transistors comprise collector, emitter and base electrodes, respectively.

9. The invention as recited in claim 8 wherein said delay means includes a resistor connected in series with said storage capacitor across the collector-emitter path of said second transistor, and wherein said switch means includes a delay transistor having first and second electrodes connected to respective ends of said storage capacitor and a third electrode connected to said second branch of said input steering means.

10. The invention as recited in claim 9 wherein said second branch of said input steering means includes a resistor connected in series with a diode between a source of input signals and said base electrode of said first transistor, and wherein said third electrode of said delay transistor is connected to the junction of said resistor and said diode of said second branch.

11. The invention as recited in claim 10 wherein said first branch of said input steering means includes a resistor connected in series with a diode between said source of input signals and said base electrode of said second transistor, said resistor of said first branch having a value of resistance greater than the value of resistance of said resistor of said second branch.

12. In a bistable circuit adapted to be switched between first and second stable states for producing output signals on first and second output terminals, respectively, in response to input pulses applied to one of first and second control terminals, respectively, an input steering network comprising first circuit means connected to the bistable circuit and having first and second resistive branches for alternately applying input pulses to the first and second control terminals, respectively, of the bistable circuit, and delay means connected with the bistable circuit and said second resistive branch of said first circuit means for alternately enabling and disabling said second resistive branch for predetermined time interval responsive to each transition of the bistable circuit between its first and second stable states, said delay means including a storage capacitor connected with one of the output terminals of the bistable circuit and switch means connected between said storage capacitor and said second branch of said first circuit means for alternately enabling and disabling said second branch in response to the stored charge across said storage capacitor whereby the bistable circuit is accurately switched in response to slow rise time input pulses.

13. The invention as recited in claim 12 wherein said first circuit means includes a first resistor serially connected at a junction point to a first diode to form said first branch and a second resistor serially connected at a junction point to a second diode to form said second branch.

14. The invention as recited in claim 13 wherein said first resistor has a value of resistance greater than the value of resistance of said second resistor.

15. The invention as recited in claim 13 wherein said switch means is connected between said storage capacitor and said junction point of said second branch of said first circuit means.

16. The invention as recited in claim 15 wherein said switch means comprises a transistor having its base-emitter junction connected across said storage capacitor and its collector electrode connected to said junction of said and second branch.

* * * * *